United States Patent [19]

Strahorn et al.

[11] 4,087,252
[45] May 2, 1978

[54] FLUIDS MIXING AND DISTRIBUTING APPARATUS

[75] Inventors: David F. Strahorn; Roger F. Goldstein, both of Oakland; Dennis R. Cash, Novato, all of Calif.

[73] Assignee: Chevron Research Company, San Francisco, Calif.

[21] Appl. No.: 730,484

[22] Filed: Oct. 7, 1976

[51] Int. Cl.² ............................ B01J 8/02; B01J 8/04; C10G 13/00
[52] U.S. Cl. .................................. 23/288 R; 23/283; 23/288 K; 208/48 Q; 208/146; 261/97
[58] Field of Search ................ 23/288 R, 288 K, 283, 23/289, 284 US; 261/96, 97, 94; 208/48 Q, 108, 143, 146

[56] References Cited

U.S. PATENT DOCUMENTS

| | | | |
|---|---|---|---|
| 3,541,000 | 11/1970 | Hanson et al. | 23/288 R X |
| 3,598,541 | 8/1971 | Hennemuth et al. | 23/288 R |

Primary Examiner—Joseph Scovronek
Attorney, Agent, or Firm—D. A. Newell; R. H. Davies; W. D. Reese

[57] ABSTRACT

Apparatus and a process for mixing and horizontally distributing vertically flowing fluids are disclosed, the apparatus being adapted to be self-supporting in a vertically elongated shell or to support a bed of particulate solids within a shell. The process and apparatus are particularly useful for supporting an upper catalyst bed and for mixing and distributing liquid hydrocarbons and a hydrogen-containing gas across the cross-section of a downstream catalyst bed in a reactor system. The apparatus is preferably adapted for introducing a cooling gas into a reaction stream between upstream and downstream catalyst beds.

6 Claims, 5 Drawing Figures

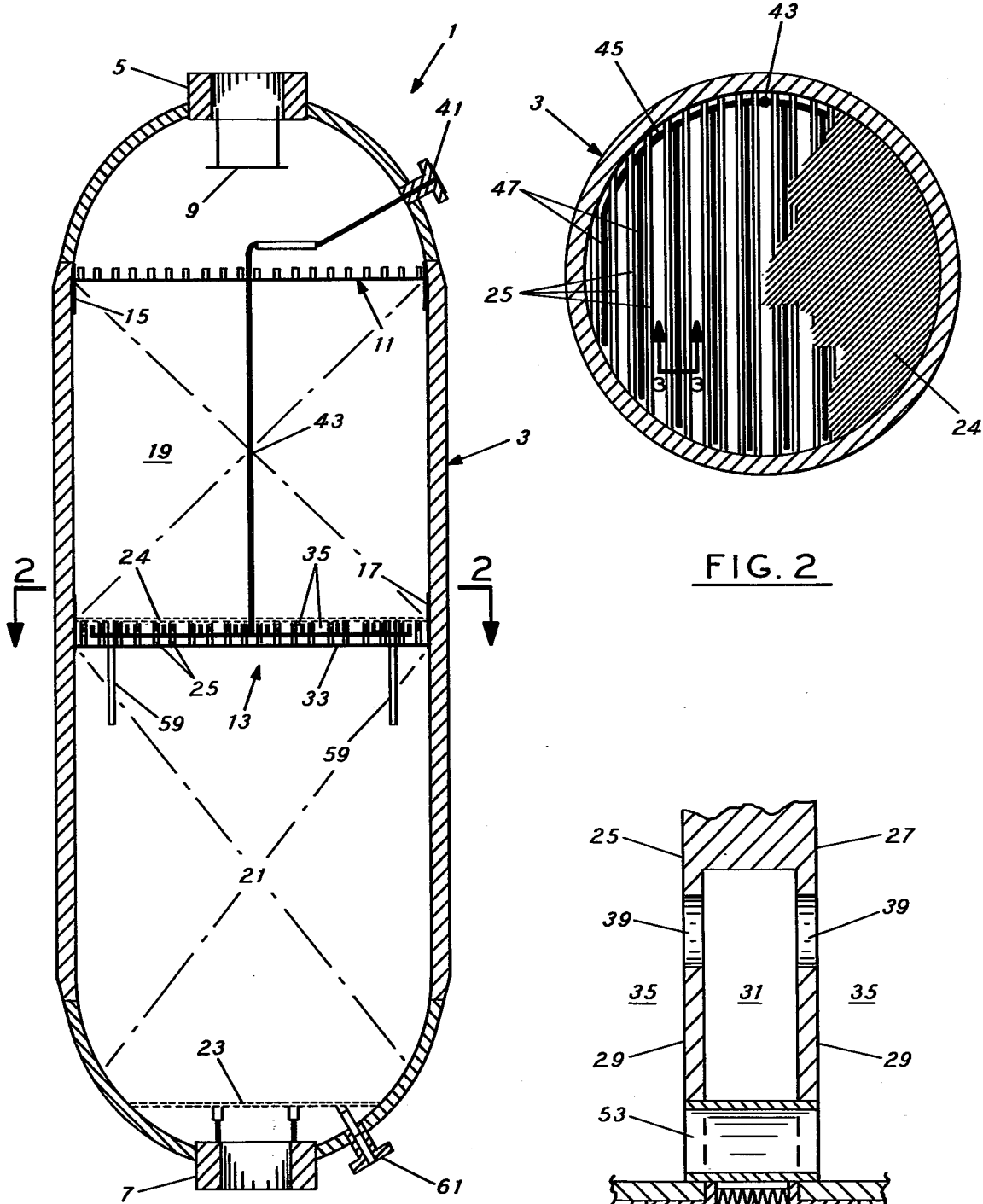

FLUIDS MIXING AND DISTRIBUTING APPARATUS

BACKGROUND OF THE INVENTION

It is often desirable to mix two or more fluids and to distribute the fluids over a horizontal cross-section in a fluids handling system. For example, in processing a reactant stream of liquid hydrocarbons and hydrogen-containing gas in a catalytic reactor, it is important that the hydrogen-containing gas and hydrocarbons are well mixed before they are introduced into a catalyst bed. It is also important that the mixture is distributed relatively evenly across the whole cross-section of surface of the catalyst bed, so that the full capacity of the catalyst can best be utilized. Proper mixing and distribution of the fluids are also important in preventing the occurrence of overly hot or cold areas within a catalyst bed and for preventing turbulence and abrasion of catalyst particles.

In prior art systems for mixing and distributing downwardly flowing liquids and gases, three separate means have been used to accomplish three critical functions. The three functions are: (1) liquid-gas mixing; (2) liquid-gas distribution over a wide horizontal cross-section in the system; and (3) means for supporting the typically heavy liquid-gas mixing equipment, distribution equipment and any catalyst or other particulate solids bed above the equipment.

In many presently used fluids mixing and distributing systems, a single, vertically elongated reactor vessel is employed. Internally, the vessel is divided into several catalyst bed spaces. Catalyst supporting systems, quench gas introduction systems, fluids mixing systems, and fluids distributing systems are located between the bed spaces. Generally, at the bottom of each catalyst bed space there is located a perforated plate or other fluid-permeable means for supporting the catalyst bed. The perforated plate is normally made of heavy steel, and is anchored to the wall of the vessel, and is typically partially supported by heavy cross beams extending entirely across the vessel. Conventionally, a conduit grid or similar means is located in a space below the catalyst supporting means for introducing hydrogen quench gas. Below the quench gas introduction equipment, which also may require supporting beams, are normally provided means for mixing downwardly flowing liquid hydrocarbons and hydrogen-rich gas and means for mixing quench gas with the downwardly flowing fluids. In some cases, distribution means is provided adjacent to, or below, the fluids mixing equipment in order to distribute the fluids horizontally over a downstream catalyst bed. This distribution equipment also normally requires supporting means such as crossbeams. Other than providing support for the upper catalyst bed and mixing and distributing equipment, crossbeams or other supporting means are extraneous to carrying out the mixing and distributing funtions.

Various specific reactor internals designs have been suggested which attempt both (a) to provide adequate mixing of gases and liquids and (b) to provide adequate horizontal distribution of liquid-gas mixtures over a downstream catalyst bed. Such devices have often been expensive and overly difficult to fabricate, install and maintain. In contrast, the apparatus of the present invention, operated according to the process of the present invention, provides efficient mixing of liquid and gas flowing downwardly in a shell and also provides efficient distribution of the mixed fluids across the entire horizontal cross-section of the flow path, and does so without the use of overly heavy, expensive and difficult-to-install reactor internals, such as are found in many prior art devices. Further, the apparatus of the present invention employs the same elements to carry out all three functions of (1) fluid mixing, (2) fluid distribution and (3) catalyst bed and equipment support.

SUMMARY OF THE INVENTION

In an embodiment, the present invention relates to apparatus for mixing and distributing a liquid and a gas flowing in a generally vertical closed path, comprising in combination: a plurality of rigid support beams disposed horizontally in generally parallel spaced relationship entirely across the path; each of the cross-beams including a rigid, generally horizontal, longitudinally extending cross-member and a pair of rigid vertical partitions extending downwardly from each of the cross-members and transversely spaced to form a downwardly open distribution space below each of the cross-members; means forming a plurality of horizontal partitions extending entirely across the space between the beams, one of the horizontal partitions and at least one of the vertical partitions forming an upwardly open liquid accumulation space extending horizontally alongside each of the vertical partitions; means for passing the liquid from each of the accumulation spaces through at least one adjacent vertical partition into at least one adjacent distribution space; and means for passing the gas from each of the accumulation spaces through the adjacent vertical partition into the adjacent distribution space.

Preferably, the means for passing the liquid and gas through the partitions into the distribution space include a plurality of lower openings horizontally spaced along the partitions for passing the liquid from a lower portion of the accumulation space into the distribution space through the partition and a plurality of horizontally spaced higher openings through the partitions above the lower openings for passing the gas through the partitions.

The apparatus preferably further includes means for maintaining liquid in each of the accumulation spaces at approximately the same level, such as fluid distribution conduits connecting the accumulation spaces.

The apparatus further preferably includes means for introducing a quench gas into the accumulation spaces, such as a fluid distribution conduit extending longitudinally in at least one of the accumulation spaces having a plurality of openings for introducing quench fluid into the accumulation spaces.

The apparatus preferably further includes fluids mixing means operatively disposed in the bottom of at least one of the distribution spaces, such as a screen disposed across the bottom opening of each distribution space.

In another embodiment, the present invention relates to a process for horizontally distributing a liquid and a gas in downward flow in a generally vertical path, comprising the steps of: accumulating portions of the liquid in a plurality of liquid phases, one of the liquid phases being located in each of a plurality of upwardly open horizontally spaced generally parallel liquid accumulation spaces extending longitudinally entirely across the path; flowing the liquid from each of the liquid phases laterally through a plurality of first openings through an adjacent vertical partition into a liquid distribution space, each of the liquid distribution spaces extending longitudinally entirely across the path between adjacent accumulation spaces, each distribution space being separated from each adjacent accumulation space by one of the vertical partitions, the first openings being longitudinally spaced along the entire length of the partitions; flowing portions of the gas from above the liquid phases in each of the accumulation spaces laterally through a plurality of longitudinally spaced second openings through each of the partitions into each of the distribution spaces, the second openings being located vertically above upper surfaces of the liquid phases in each of the accumulation spaces and being longitudinally spaced along the entire length of the partitions; and passing the liquid and the gas downwardly from each of the distribution spaces into the vertical path along the entire length of the distribution spaces.

The apparatus and process of the present invention are particularly applicable for use in catalytic processing systems for hydrotreating and hydrocracking of relatively heavy petroleum hydrocarbon stocks. Such processing systems typically use reactors having inside diameters of 5–15 feet with about 2–5 vertically spaced catalyst bed spaces with lengths of 10 to 50 feet, and use catalysts having particle diameters of 1/32 inch to ¼ inch. Although the invention is particularly applicable to use in hydrogen treatment of hydrocarbons, the process and apparatus are not limited to such use and can be used in any system where mixture of a vertically flowing liquid and a vertically flowing gas, or a lighter liquid and heavier liquid, is desired.

BRIEF DESCRIPTION OF THE DRAWINGS

Further objects, embodiments and advantages of the present invention will be apparent from the following description of the invention and by reference to the attached drawings, in which:

FIG. 1 is a vertical section of view of mixing and distributing apparatus according to the invention;

FIG. 2 is a sectional plan view of the apparatus depicted in FIG. 1 taken along A—A in FIG. 1;

FIG. 5 is a vertical sectional view of the detail shown in FIG. 4 taken along D—D in FIG. 4.

DETAILED DESCRIPTION OF THE INVENTION

Figure 4:
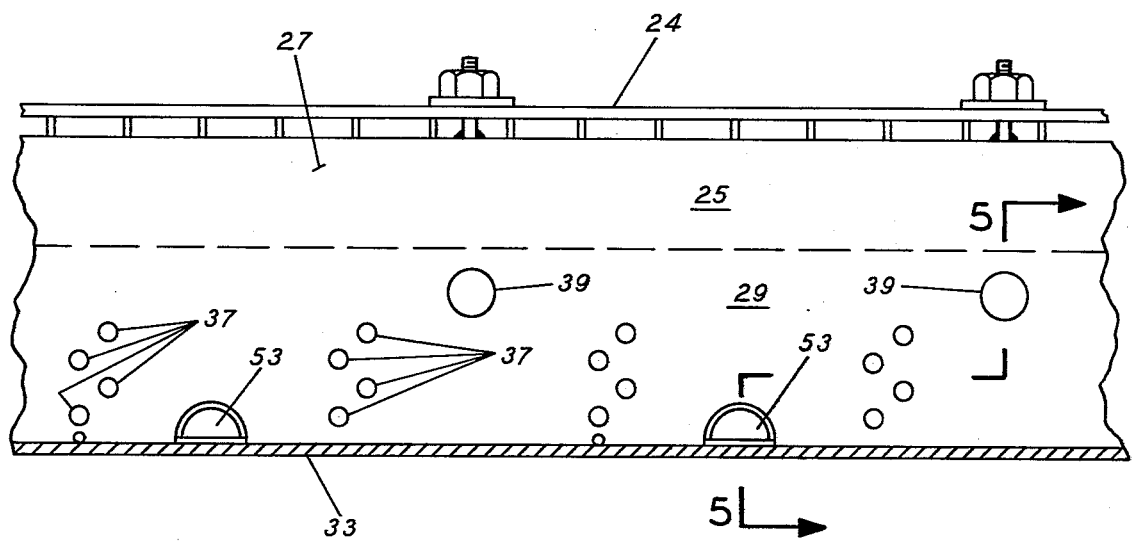
FIG. 4 is a vertical sectional view of the detail shown in FIG. 3 taken along C—C in FIG. 3.

The present invention can best be described with reference to the attached drawings, which depict a preferred embodiment of the invention. It will be understood, however, that it is not intended thereby to limit the invention to the specific embodiment shown, and that it is intended to cover the alternatives, modifications, and equivalents of the embodiment described which are apparent and are within the scope of the appended claims.

Turning first to FIG. 1, there is shown a multibed reactor vessel 1, including a shell 3, having a reactants inlet 5 at the top thereof and a products outlet 7 at the bottom thereof. The shell 3 provides a generally vertical closed path through which liquid and gas, such as liquid hydrocarbons and a hydrogen-rich gas, are passed in downward flow in a generally vertical path between the inlet 5 and the outlet 7. The reactor system may include a horizontal baffle 9 across the inlet 5 to diffuse the momentum of incoming fluids.

Disposed across the horizontal cross-sections of the closed path in the interior of the shell 3, according to the invention, are an upper mixer-distributor apparatus 11 and a lower mixer-distributor apparatus 13 for mixing liquid hydrocarbons and hydrogen-rich gas and for distributing the mixed liquid and gas over the horizontal cross-section of the interior of the shell 3. The mixer-distributor 11 is conventionally supported on the shell 3, as for example, by welding to an inverted skirtplate 15, and the mixer-distributor 13 is similarly conventionally supported on the shell, as by bolting to a skirt plate 17. An upper catalyst bed space 19 is located between the upper mixer-distributor 11 and the lower mixer-distributor 13. Similarly, a lower catalyst bed space 21 is located below the mixer-distributor 13 and above a catalyst supporting plate 23 disposed just above the fluids outlet 7.

The mixer-distributor 11 is substantially indentical to the mixer-distributor 13, except that the mixer-distributor 13 is adapted, in addition to being self-supporting, for supporting a catalyst bed located in the space 19, as for example, by positioning a catalyst support screen 24 upon the mixer-distributor 13. The mixer-distributor 13 also additionally includes means, not included in the mixer-distributor 11, for introducing quench gas into the downwardly flowing stream, as further described below. While the description hereinafter refers specifically to the mixer-distributor 13, it will be appreciated that the structure and mixing and distributing functions of the mixture-distributor 11 were generally the same as those of the mixer-distributor 13, and that the mixer-distributor 13 simply includes additional elements and/or structurally stronger elements not required for the operation of the mixer-distributor 11.

According to the invention, the mixer-distributor 13 includes a plurality of rigid support beams, disposed horizontally in generally parallel, spaced relationship, such as the beams 25. The length of each beam 25 is sufficient that the beams 25 each extend longitudinally entirely across the closed path formed by the shell 3 (see FIG. 2). Each of the beams 25 includes a rigid, longitudinally extending cross-member, such as the cross-members 27, and each beam 25 also includes a pair of rigid, vertical partitions rigidly fixed to each cross-member 27 and extending downwardly from each cross-member 27, such as the vertical partitions 29 (see FIG. 3). The two vertical partitions 29 on each of the beams 25 are fixed transversely spaced on the cross-members 27 to form a downwardly open distribution space, such as a distribution space 31, below each of the cross-members 27. The box-shaped cross-sectional configuration of each beam 25, as provided by the horizontal cross-members 27 and the vertical partitions 29, gives each of the beams 25 a high degree of supporting strength. In addition to being self-supporting, the beams 25 aid in supporting the other elements of the mixer-distributor 13, as well as providing support, if necessary, for a catalyst bed in the upper catalyst bed space 19.

Figure 3:
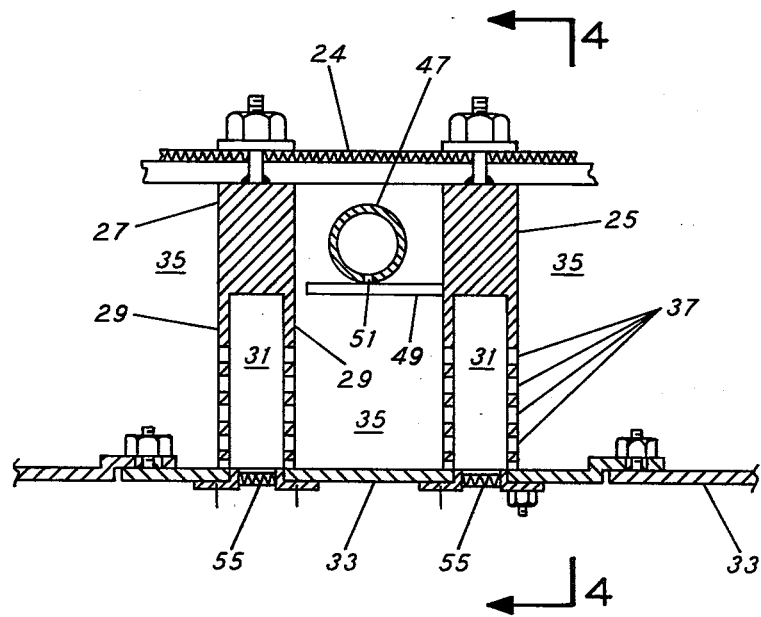
FIG. 3 is a vertical sectional detailed view of the apparatus depicted in FIGS. 1 and 2 taken along B—B in FIG. 2.

Further according to the invention, the mixer-distributor 13 includes a plurality of horizontal partitions extending horizontally entirely across the horizontal cross-section of the closed path formed by the shell 3 between the beams 25, such as a plurality of horizontal partition plates 33 (see FIG. 3). The horizontal partitions 33 preferably extend between the bottom ends of the vertical partitions 29 and also extend to the inner surface of the skirt 17 at the shell 3 to close off the interior of the shell 3 to the direct vertical flow of fluids between the beams 25. The horizontal partitions 33 and the vertical partitions 29 together form upwardly open liquid accumulation spaces, such as spaces 35 extending alongside each of the vertical partitions 29. Each of the liquid accumulation spaces 35 thus extends longitudinally entirely across the horizontal cross-section of the vertical part formed by the shell 3, as best shown in FIG. 2.

Means are provided for passing liquids from each of the upwardly opening accumulation spaces 35 through at least one of the adjacent vertical partitions 29 into at least one adjacent downwardly opening distribution space 31, as by a plurality of horizontally spaced openings 37 (see FIG. 4) from a lower portion of each accumulation space 35 through a vertical partition 29 into each distribution space 31. Preferably, the openings 37 are also spaced vertically in the vertical partition 29, opening at several vertical levels between the distribution spaces 31 and the accumulation spaces 35.

Means are likewise provided for passing gases from each of the accumulation spaces 35 through at least one adjacent vertical partition 29 into at least one adjacent distribution space 31, such as a plurality of longitudinally spaced openings 39 from an upper portion of each accumulation space 35 into each distribution space 31. It may be advantageous in some cases to size the openings 39 to be relatively large and slotted, as shown, in order to allow free passage of gas from the upper portions of the accumulation spaces 35 into the distribution spaces 31 through the openings 39 without excessive pressure drop, while at the same time maintaining the flow of liquids through the openings 37 into the distribution spaces 31 at a relatively even rate by sizing the openings 37 relatively smaller. Of course, gases may also pass through any of the openings 37 which are above a liquid level in the accumulation spaces 35.

Preferably, means are provided for introducing a fluid, such as a hydrogen-rich quench gas, directly into the liquid accumulation spaces 35 from outside the shell 3, such as a quench gas inlet 41 and a quench gas conduit 43, which carry hydrogen-rich quench gas into the shell 3 and into the mixer-distributor 13 (see FIG. 1). The conduit 43 leads into a manifold conduit 45, which runs around a portion of the perimeter of the mixer-distributor 13 (see FIG. 2). From the manifold 45, a plurality of fluid distribution conduits, such as the conduits 47, extend longitudinally within liquid accumulation space 35, preferably in alternate spaces 35, (see FIGS. 2 and 3). The quench gas distribution conduits 47 may be supported in the accumulation spaces 35 by conventional means, such as one or more horizontal pins or rods 49 fastened at one end to one of the vertical partitions 29, and extending across the spaces 35. The fluid distribution conduits 47 each have a plurality of longitudinally spaced openings 51 therein for introducing fluid, such as quench gas, uniformly into the accumulation spaces 35. The openings 51 are preferably positioned on the conduits 47 to introduce fluid from the distribution conduits 47 downwardly into liquid phases located in the lower portions of the accumulation spaces 35.

According to the invention, the apparatus also preferably includes means for maintaining substantially equal levels for liquid phases located in each of the accumulation spaces 35, as by inclusion of at least one conduit, such as conduits 53, communicating directly between the lower portions of adjacent accumulation spaces 35.

The conduits 53 extend through the vertical partition 29 and the distribution spaces 31 in the beams 25, but are not in direct communication with the spaces 31.

The apparatus also preferably includes means for mixing fluids disposed in the downwardly open bottom end of at least one of the distribution spaces 31, such as screens 55, which are disposed across the downwardly open bottom ends of each of the distribution spaces 31 as by bolting to the horizontal partition plates 33 on either side of the distribution spaces 31 (see FIG. 3).

The shell 3 may be equipped with conventional means for unloading particulate catalysts therefrom, such as catalyst drain pipes 59, which lead from the catalyst bed space 19 to the catalyst bed space 21, and a catalyst drain outlet 61 in the bottom of the shell 3, adjacent the products outlet 7.

As will be evident from the following description of the operation of the apparatus, the support beams 25 have multiple functions, including liquid-gas mixing, liquid-gas distribution, and support of the mixer-distributor 13 and a catalyst bed in the space 19, with the beams 25 being supported on the shell 3 at their longitudinal ends.

In operation of the preferred embodiment of the apparatus depicted in FIGS. 1–5, according to a preferred embodiment of the process of the present invention, a liquid and a gas, such as a hydrocarbonaceous liquid and a hydrogen-rich gas, are passed in downward flow in a generally vertical path formed by the inlet 5, the shell 3, and the outlet 7. The liquid and gas are mixed and distributed horizontally over the top surface of a catalyst bed located in the space 19 by the mixer-distributor 11, in a manner the same as operation of the mixer-distributor 13, as described below. After passing through the catalyst bed space 19, hydrocarbonaceous liquid and hydrogen-rich gas flow downwardly through the catalyst support screen 24 into the upwardly open, horizontally spaced, generally parallel liquid accumulation spaces 35, each of which extends longitudinally entirely across the vertical path of the fluids in the shell 3, as best shown in FIG. 2. Hydrocarbonaceous liquid accumulates in the bottom portions of the accumulation spaces 35, forming a liquid phase in each of the spaces 35. From the liquid phases, the hydrocarbonaceous liquid flows through the plurality of lower openings 37 in the vertical partitions 29 into the adjacent distribution spaces 31. The openings 37 are spaced along the entire length of the vertical partitions 29 so that liquid enters the distribution spaces 31 along their entire lengths at a relatively even rate. The hydrocarbonaceous liquid is thereby distributed relatively evenly over the horizontal cross-section of the vertical path formed by the shell 3 when the liquid passed through the open bottom ends of the distribution spaces 31 into downstream the catalyst bed space 21. The upper surface of each of the liquid phases in each of the accumulation spaces 35 is kept at substantially the same level as the surfaces of adjacent phases by gravity-induced flow of hydrocarbonaceous liquid from one accumulation space into another through the conduits 53 whenever any difference in liquid level exists between liquid phases in adjacent accumulation spaces 35.

Hydrogen-rich quench gas is introduced through the inlet 41 and the conduit 43, and flows through the manifold conduit 45 and distribution conduits 47. The quench gas flows downwardly through the openings 51 into contact with the liquid phases located in the lower portions of the accumulation spaces 35. Thus, the quench gas, which is normally much cooler than the liquid and gas already in the spaces 35, first contacts the liquid, rather than the partitions 29, avoiding uneven heating.

The hydrogen-rich gas which accumulates above each liquid phase in each of the accumulation spaces 35 flows laterally through openings 39 and through any of the openings 37 which are above the liquid level in the accumulation spaces 35. The openings 39 located above the level of the openings 37 and preferably are likewise spaced along the entire length of the partitions 29. The portions of hydrogen-rich gas passing through the openings 39 into the distribution spaces 31, thereupon mix with hydrocaronaceous liquid entering the spaces 31 through the openings 37.

The mixture of hydrocarbonaceous liquid and hydrogen-rich gas is passed downwardly from the open bottom ends of each of the distribution spaces 31 along the entire length of each of the spaces 31, through the screens 55. The screens 55 serve to further mix the liquid and gas and also to provide a pressure drop for regulation of the fluid flow rate. The liquid-gas mixture thus passes downwardly into a bed of catalyst located in the space 21 over essentially the entire horizontal cross-section of the generally vertical path formed by the shell 3. After passing through catalyst located in the space 21 and through the catalyst support plate 23, the liquid and gas are withdrawn from the outlet 7 and are recovered for further processing, separation, or like treatment. The catalyst outlet 61 is kept closed during normal operation of the reactor apparatus 1 as described.

Various modifications and variations within the scope of the present invention will be apparent to those skilled in the art from the foregoing description. For example, the vessel may include more than two particulate solids beds, in which case fluids mixing and distributing apparatus as described above may be included between any two or more particulate solids beds. As shown in FIG. 1 (i.e., the mixer-distributor 11), the fluids mixing and distributing apparatus of the invention may also be employed above a single catalyst bed for simply mixing and distributing fluids entering the reactor prior to their flow through the reactor catalyst bed, without being adapted for supporting a catalyst bed. The apparatus may also be employed for mixing and distributing a mixture of a lighter liquid and a heavier liquid, and may, in some cases, be employed for mixing and distributing fluids in upflow. Accordingly, these alternatives, as well as other apparent modifications and variations of the invention are included within the scope of the appended claims.

What is claimed is:

1. Apparatus for mixing and distributing a liquid and a gas flowing in a generally vertical closed path through a bed of particulate material, comprising in combination:

a plurality of rigid beams disposed horizontally in generally parallel spaced relationship and extending longitudinally entirely across said path;

each beam including a downwardly open distribution space which extends upwardly and terminates short of an upper edge of said beam to form a rigid cross-member portion and a pair or rigid vertical partition portions extending vertically downwardly from said cross-member portion in transversely spaced relationship on opposite sides of said space;

screen means supported on said cross-member portions for carrying said bed of particulate material;

horizontal partitions extending between lower ends of the vertical partition portions of adjacent beams to prevent the vertical flow of said liquid and gas past said beams, and to form, with said vertical partition portions, a plurality of upwardly open liquid accumulation spaces extending horizontally alongside each of said distribution spaces;

first passage means for conducting accumulated liquid from a lower portion of each accumulation space through at least one of the vertical partition portions and into the distribution space of an adjacent beam for downward distribution; and second passage means above said first passage means for conducting accumulated gas from an upper portion of each accumulation space through at least one of the vertical partition portions and into the distribution space of an adjacent beam to be mixed with liquid in such distribution space and distributed downwardly therewith.

2. Apparatus as defined in claim 1 further including means for introducing a fluid into said apparatus including a fluid distribution conduit extending longitudinally in at least one said liquid accumulation space and having a plurality of longitudinally spaced openings therein for introducing fluid into said accumulation space.

3. Apparatus as defined in claim 1 further including means for maintaining substantially equal liquid levels in said accumulation spaces.

4. Apparatus as defined in claim 3 wherein said means for maintaining substantially equal liquid levels comprises at least one conduit communicating between said lower portions of adjacent said accumulation spaces through each said beam.

5. Apparatus as defined in claim 1 further including means for mixing fluids disposed in a downwardly open bottom end of at least one said distribution space.

6. Apparatus as defined in claim 5 wherein said means for mixing fluids is a screen disposed across the downwardly open bottom end of each said distribution space

* * * * *